Jan. 9, 1934.                G. A. HUGHES                1,943,259
METHOD OF ELECTRIC WELDING
Filed May 18, 1929

INVENTOR.
GROVER A. HUGHES
BY
ATTORNEY.

Patented Jan. 9, 1934

1,943,259

UNITED STATES PATENT OFFICE 1,943,259

METHOD OF ELECTRIC WELDING

Grover A. Hughes, Youngstown, Ohio, assignor to Truscon Steel Company, Youngstown, Ohio, a corporation of Michigan Application May 18, 1929. Serial No. 364,093

4 Claims. (Cl. 219—10)

In the welding together of metal structures, it has been the custom to bring the two parts to be welded into contact and apply the electrodes in making such contact on the outer sides of the parts and in direct line with the point of contact at which the welding takes place. Where one of the members is relatively thin as for instance when it is made of sheet metal, and the other is thicker, this welding operation has a tendency to cause the thicker member to be sunk into the thin member so that the area of metal necessary to break out in order to pull the welding apart is considerably lessened.

The object of the present invention is to provide a process of and apparatus for welding articles, so that this thinning down of the already thin member that is welded, is to a very great extent obviated and as a consequence a much stronger weld is obtained than heretofore. In fact practical experience has demonstrated that in some cases it is more than double that of the old type of weld.

Figure 1:
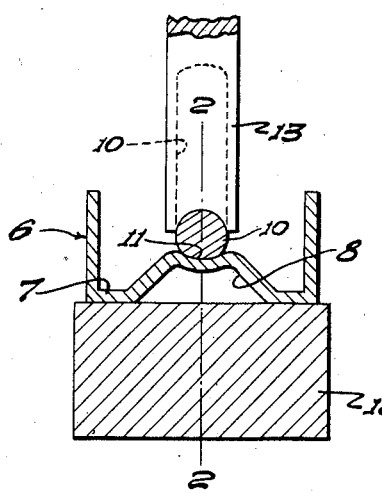
Figure 1 is a vertical cross sectional view of two members to be welded in associated relation and with the electrodes operating upon them to perform the novel method.
Figure 2:
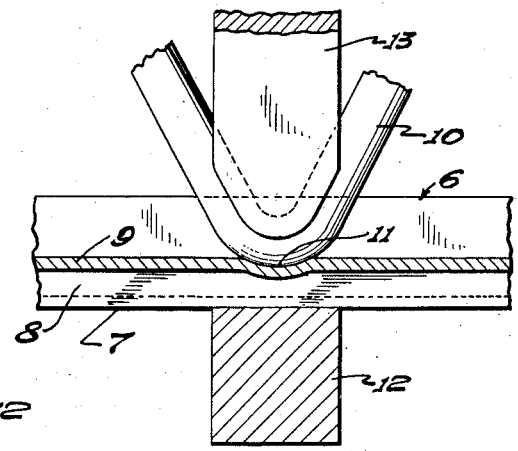
Figure 2 is a sectional view on the line 2—2 of Figure 1.

Referring first to the embodiment illustrated in Figures 1 and 2, a sheet metal member 6 is employed, which may be the chord of a beam or the side member of a skeleton pole. It is provided with an outer wall 7 having a central longitudinal inset rib 8. This rib is provided with a flat bottom 9.

The other or lattice member may be a rod, usually of serpentine form, and in the drawing one bend 10 is illustrated, the knuckle 11 of which is made to contact with the flat bottom 9 of the flange 8 of the chord member 6.

In the method heretofore employed, an electrode was inserted in the channel formed in the outer side of the rib 8 and bearing against the outer face of the flat bottom 9 in line with the knuckle 11 where it contacted with the said bottom. Another electrode was placed in the bight of the rod 10 and was also in line with the point of contact between the two parts or members to be welded. These electrodes were then forced together during the welding operation and as heretofore explained, the relatively heavy knuckle would embed itself in the thin sheet metal of the bottom 9 so that the sheet metal actually was made thinner and created a relatively weak point of fusion.

In the present apparatus and process an electrode 12 is employed for the outer side of the sheet metal member and contacts with the same on opposite sides of the rib 8, leaving the said flat bottom 9 unsupported or spaced from said electrode. The other electrode 13 is of the usual construction and engages in the bight of the rod 10 in line with the point of contact between the knuckle and the flat bottom 9 of the rib. In the welding operation the electrodes 12 and 13 which deliver the welding current, are relatively moved toward each other as heretofore. The result however, is that the knuckle 11 being the heavier, will cause an outward deformation of the bottom 9 as shown in Figures 1 and 2, and the metal of both will effectively weld together without greatly weakening the sheet metal member. It has been found that as a result of this method of welding, a much stronger weld is obtained than heretofore.

Figure 3:
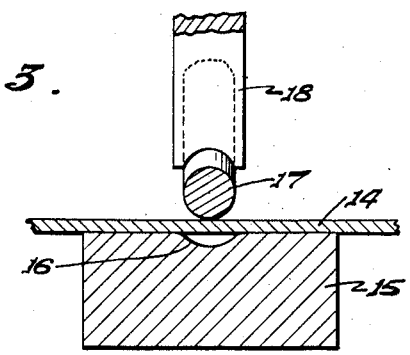
Figure 3 is a cross sectional view of a slightly modified form of construction in which the same method is carried out and the same desirable results obtained, showing the parts prior to the actual welding operation.
Figure 4:
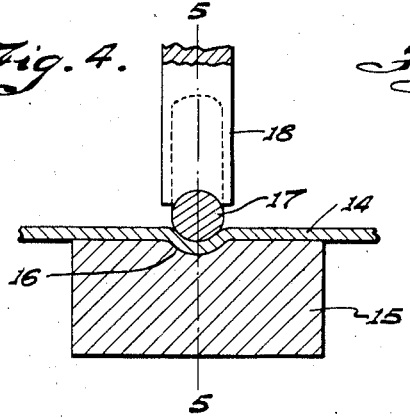
Figure 4 is a view similar to Figure 3 after the welding operation has taken place.
Figure 5:
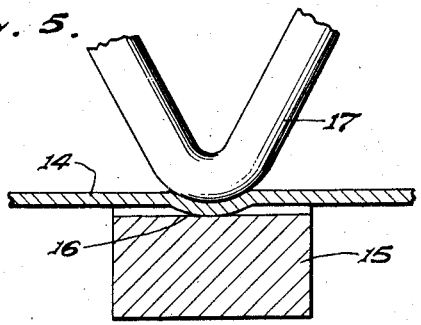
Figure 5 is a sectional view on the line 5—5 of Figure 4.

Figures 3, 4 and 5 show a slight modification in which the same effect is secured. The sheet metal member 14 in this disclosure is flat or has a flat portion against which the outer face of the electrode 15 bears. The electrode in this structure is grooved or notched as shown at 16 and the rod member 17 bears against the opposite face of the member 14 in line with said notch. The other electrode 18 operating in the bight of the rod 17, causes the sheet metal member to be bent into the said socket 16, as will be clear by reference to Figures 4 and 5, thereby insuring the same formation of structure and the same effective welded joint.

From the foregoing, it is thought that the construction, operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What I claim, is:

1. The method of electrically welding together two members of different thicknesses which consists in causing said members to contact at the desired point of welding, leaving the thinner member unsupported at said point of contact, causing sufficient pressure to be brought to bear to cause the thicker element to bodily deform the thinner element at the point of welding and welding together the thicker member to the deformed portion of the thinner member by passing a welding current through said members at the point of contact and deformation.

2. The method of welding together a plate metal member and a bent rod member, which consists in bringing together the knuckle of the rod member and plate member, passing a welding current through the contacting portions of said members and causing the former to bodily deform the latter at the point of contact and welding by said current the knuckle to the plate member in the pocket formed in the latter by said knuckle.

3. The method of welding together a plate metal member and a bent rod member, which consists in placing an electrode in contact with the plate member at spaced points, placing another electrode in the bend of the rod member, causing the knuckle of the rod member to contact with the face of the plate member opposite to that contacted by the first electrode and between the points of contact thereof, pressing together the rod member and plate member with sufficient force to bodily bend the plate member between the points of contact of the first electrode, and passing a welding current through the electrodes and the contacting portions of the members to cause the members to be welded together at the place of deformation.

4. The method of welding together a plate metal member and a bent rod member which consists in bringing together the knuckle of the rod member and plate member, placing an electrode in contact with the plate member on the opposite side of the same to the side contacted by the knuckle and at spaced points on opposite sides of the line of contact, leaving the plate member unsupported at said line of contact, placing another electrode in the bend of the rod and in line with said point of contact between the plate member and rod member, pressing the electrodes toward each other and causing the knuckle to deform the plate member between the spaced points of contact of the first electrode, and passing a welding current through the electrodes and the contacting portions of the members to cause the welding together of the two at the place of deformation.

GROVER A. HUGHES.